US007941387B2

(12) United States Patent
Amini et al.

(10) Patent No.: US 7,941,387 B2
(45) Date of Patent: May 10, 2011

(54) METHOD AND SYSTEM FOR PREDICTING RESOURCE USAGE OF REUSABLE STREAM PROCESSING ELEMENTS

(75) Inventors: Lisa Amini, Yorktown Heights, NY (US); Henrique Andrade, Croton-on-Hudson, NY (US); Wei Fan, New York, NY (US); James R. Giles, Yorktown Heights, NY (US); Kirsten W. Hildrum, Hawthorne, NY (US); Deepak Rajan, Fishkill, NY (US); Deepak S. Turaga, Nanuet, NY (US); Rohit Wagle, Elmsford, NY (US); Joel L. Wolf, Katonah, NY (US); Philip S. Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 855 days.

(21) Appl. No.: 11/935,079

(22) Filed: Nov. 5, 2007

(65) Prior Publication Data

US 2009/0119238 A1 May 7, 2009

(51) Int. Cl.
*G06F 17/00* (2006.01)
*G06N 5/02* (2006.01)
(52) U.S. Cl. ........................................................ 706/46
(58) Field of Classification Search ..................... 706/46
See application file for complete search history.

(56) References Cited

U.S. PATENT DOCUMENTS

| 6,671,254 B1 | 12/2003 | Nakahira |
| 6,748,174 B2 | 6/2004 | Milton et al. |
| 6,792,174 B1 | 9/2004 | Ramaswami |
| 6,809,734 B2 | 10/2004 | Suzuoki et al. |
| 7,263,096 B2 | 8/2007 | Yang et al. |

(Continued)

FOREIGN PATENT DOCUMENTS

EP 0568402 B1 1/1999

(Continued)

OTHER PUBLICATIONS

Bansal et al., U.S. Appl. No. 11/374,192; filed Mar. 13, 2007.

(Continued)

*Primary Examiner* — Michael B. Holmes
*Assistant Examiner* — Li-Wu Chang
(74) *Attorney, Agent, or Firm* — Cantor Colburn LLP; William Stock

(57) ABSTRACT

A method is provided for generating a resource function estimate of resource usage by an instance of a processing element configured to consume zero or more input data streams in a stream processing system having a set of available resources that comprises receiving at least one specified performance metric for the zero or more input data streams and a processing power of the set of available resources, wherein one specified performance metric is stream rate; generating a multi-part signature of executable-specific information for the processing element and a multi-part signature of context-specific information for the instance; accessing a database of resource functions to identify a static resource function corresponding to the executable-specific information and a context-dependent resource function corresponding to the context-specific information; combining the static resource function and the context-dependent resource function to form a composite resource function for the instance; and applying the resource function to the at least one specified performance metric and the processing power to generate the resource function estimate of the at least one specified performance metric for processing by the instance.

19 Claims, 8 Drawing Sheets

U.S. PATENT DOCUMENTS

| | | | |
|---|---|---|---|
| 2002/0131103 A1 | 9/2002 | Bambos | |
| 2004/0052527 A1 | 3/2004 | Kirby | |
| 2004/0131308 A1 | 7/2004 | Mao et al. | |
| 2004/0148152 A1* | 7/2004 | Horikawa | 703/22 |
| 2005/0105905 A1 | 5/2005 | Ovadia et al. | |
| 2007/0043742 A1 | 2/2007 | Arguello et al. | |
| 2007/0198971 A1 | 8/2007 | Dasu et al. | |
| 2007/0204020 A1 | 8/2007 | Anderson et al. | |
| 2007/0211280 A1 | 9/2007 | Bansal et al. | |
| 2007/0214458 A1 | 9/2007 | Bansal et al. | |
| 2008/0025238 A1 | 1/2008 | McCown et al. | |
| 2008/0025288 A1 | 1/2008 | Benner et al. | |
| 2008/0250390 A1 | 10/2008 | Feblowitz et al. | |
| 2009/0089418 A1* | 4/2009 | Saha et al. | 709/224 |
| 2009/0238178 A1 | 9/2009 | Giles et al. | |

FOREIGN PATENT DOCUMENTS

| | | |
|---|---|---|
| JP | 2006113566 A | 4/2006 |
| WO | 0186998 A1 | 11/2001 |

OTHER PUBLICATIONS

Lisa Amini, et al., Adaptive Control of Extreme-scale Stream Processing Systems, Proceedings of the 26th IEEE International Conference on Distributed Computing Systems 2006, 7 pages.

Kevin J. Barker, et al., On the Feasibility of Optical Circuit Switching for High Performance Computing Systems, Conference on High Performance Networking and Computing, Proceedings of the 2005 ACM/IEEE Conference on Supercomputing, 22 pages.

William J. Daly, et al., Merrimac: Supercomputing with Streams, SC'03, Nov. 15-21, 2003, Phoenix, Arizona, Copyright 2003 ACM, 8 pages.

U.S. Appl. No. 11/840,556, filed Aug. 17, 2007.
U.S. Appl. No. 12/052,814, filed Mar. 21, 2008.
U.S. Appl. No. 12/052,836, filed Mar. 21, 2008.
U.S. Appl. No. 12/193,125, filed Aug. 18, 2008.

Charu C. Aggarwal et al., Challenges and Experience in Prototyping a Multi-Modal Stream Analytic and Monitoring Application on System S, VLDB, Sep. 23-28, 2007, Vienna, Austria.

International Search Report; International Application No. PCT/EP2009/060483; International Filing Date: Aug. 13, 2009, Date of Mailing: Oct. 19, 2009; 11 pages.

S.P. Chang et al, A Reconfigurable Interconnect Fabric With Optical Circuit Switch and Software Optimizer for Stream Computing Systems, Optical Society of America, 2009.

Henrique Andrade et al., SPADE: The System S Declarative Stream Processing Engine, SIGMOND, Jun. 9-12, 2008, pp. 1123-1134, Vancouver, BC, Canada.

* cited by examiner

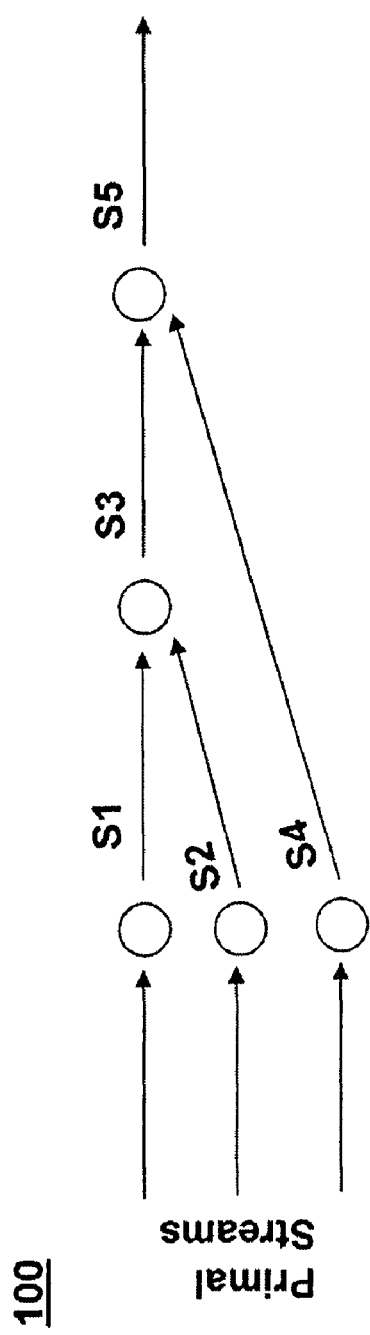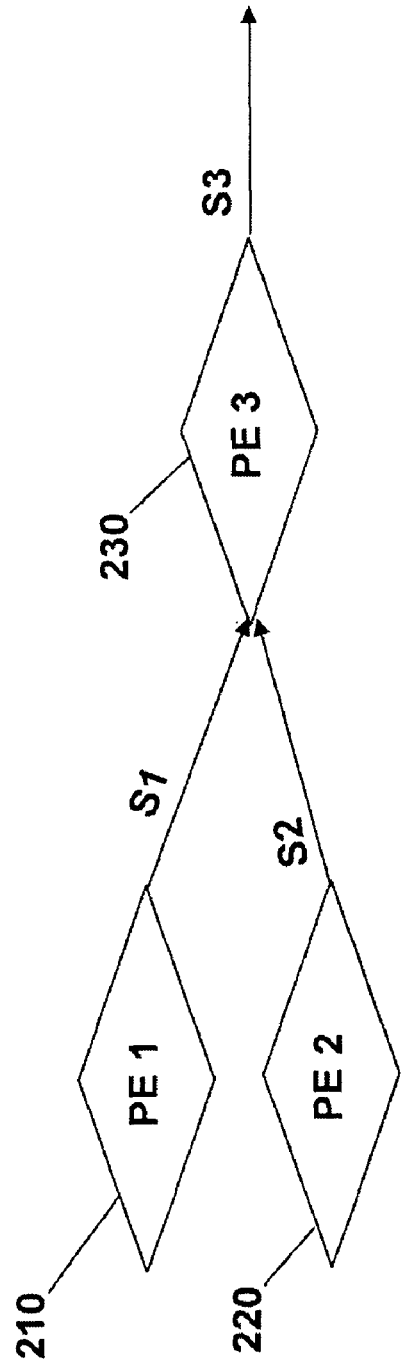

US 7,941,387 B2

METHOD AND SYSTEM FOR PREDICTING RESOURCE USAGE OF REUSABLE STREAM PROCESSING ELEMENTS

GOVERNMENT RIGHTS

This invention was made with Government support under Contract No.: H98230-05-3-0001 awarded by Intelligence Agencys. The Government has certain rights to this invention.

BACKGROUND OF THE INVENTION

1. Field of the Invention

Exemplary embodiments of the present invention relate to scheduling work in a stream-based distributed computer system, and more particularly, to mechanisms for providing useful input to a scheduler to employ in deciding how to allocate resources between processing elements in such a system.

2. Description of Background

Traditional processing units followed a sequential execution paradigm, meaning they conceptually performed only one operation at a time. As the computing needs of the world evolved, the amount of data to be managed increased very quickly, and the sequential programming model could not cope with the increased need for processing power. In response, distributed computing developed to provide for a method of parallel processing, in which different parts of a program run simultaneously on two or more computers that are communicating with each other over a network with the objective of running a program in less time.

Distributed computer systems designed specifically to handle very large-scale stream processing jobs operate by collecting, processing, and aggregating data across large numbers of real-time streams from multiple producers to multiple consumers through the use of in-network processing operators. While distributed stream processing systems are in their infancy, they are likely to become far more common in the relatively near future because of the high efficiency they provide, and are expected to be employed in highly scalable distributed computer systems to handle complex jobs involving enormous quantities of streaming data. In particular, stream processing systems scaling to tens of thousands of processing nodes that are able to concurrently support hundreds of thousands of incoming and derived streams may be employed. Such scalability can make the design of future systems highly challenging.

Rather than being a single file or discrete chunk, a stream is a continuous data feed array, such as the stock market ticker or a television channel, for which the elements can be operated on in parallel. Given a set of input and output data (streams), stream processing systems are generally configured as a series of computer-intensive operations to be applied for each element in the stream, where local on-chip memory is reused for input and output streams to minimize external memory bandwidth. Data is gathered from memory into an input stream, operated on in the stream, and then scattered from the stream as output back into memory. Such processing systems typically consist of multiple copies of two basic types of entities: (1) the streams themselves, which may be either primal (meaning they come from outside the system) or derived (meaning that they are produced by software within the system), and (2) the processing elements or executables, which are the software entities that receive, process, and publish stream data, possibly filter or annotate the stream data, and communicate with other software entities. Implementations of such systems consist of many interconnected processing elements that take streams as input, and then output other streams (and, in some cases, other, non-stream data).

One useful method of implementing such a system is to employ processing elements that are fairly simple components individually but can be connected in appropriate ways to build complex applications. A feature of this approach is that a single processing element can be designed and implemented for reuse by many different applications and jobs, which enables a software engineer to create new applications from these reusable parts. For example, a processing element that is configured to search text for a given pattern might also be implemented within in an application for making predictions about a sector of the economy or watching for news stories on a potential pandemic.

Because the data arrives in streams in stream processing systems, the amount of resources necessary for a given processing element depends on its incoming stream rates (that is, the size of the data transferred over a communication link per unit of time), which in turn depends on the incoming stream rates of further upstream processing elements and, ultimately, oil the rate of the data entering the system. Because stream rates and availability of primal streams can vary tremendously, the assignment of a predetermined, fixed processing power goal, expressed in terms of millions of instructions per second or MIPS, to a given processing element is unlikely to produce optimal results.

A major challenge in developing distributed stream processing systems is the programming difficulty. The streams serve as a transport mechanism between the various processing elements doing the work in the system. Particularly in large-scale systems, these connections can be arbitrarily complex, and the system is typically overloaded. The importance of the various work items can change frequently and dramatically. Therefore, the scheduling of such a system so as to maximize the overall importance of the work performed is a particularly challenging task.

Scheduling refers to the manner in which processes are assigned priorities in a priority queue, and the assignments are performed by a software entity known as a scheduler. A scheduler will generally be implemented to maximize the importance of all work in the system, subject to a large number of constraints of varying importance. Therefore, a primary goal for a given scheduler is to fractionally allocate resources to the processing elements so that they can process the incoming data. A second primary goal is to balance the transition of processing between the various processing elements to prevent a producing processing element from flooding or starving a consuming processing element. A third goal for a given scheduler is to allocate the total processing resources in the system amongst the various processing elements that will be run to optimize the importance of the total processing performed. The scheduling process yields as output a schedule of the processes that represents a precedence relationship among the processes.

Exemplary schedulers for distributed stream processing systems are provided in the following commonly-assigned U.S. patent applications, the contents of each of which are incorporated herein in their entirety by reference thereto: U.S. patent application Ser. No. 11/374,192, entitled "Method and Apparatus for Scheduling Work in a Stream-Oriented Computer System"; U.S. patent application Ser. No. 11/374,643, entitled "Method and Apparatus for Assigning Candidate Processing Nodes in a Stream-Oriented Computer System"; U.S. patent application Ser. No. 11/374,399, entitled "Method and Apparatus for Assigning Fractional Processing Nodes to Work in a Stream-Oriented Computer System"; and U.S. patent application Ser. No. 11/204,726, entitled "Method and Apparatus for Assigning Candidate Nodes in a Penalty-Based Computer system."

To produce an optimal allocation of resources in a large-scale, distributed stream processing system, it is important to provide accurate predictions of the effects of various resource allocations of the individual processing elements. This challenge can become complicated when the processing elements are generic components that may be reused in many different contexts. Accordingly, it is desirable to provide a way to predict resource usage in a distributed stream processing system that allows for flexible, effective scheduling.

A major development described within U.S. patent application Ser. No. 11/374,399, which is incorporated herein by reference above, is the ability to decouple the main input for a scheduler into well-defined atomic components by employing a so-called "resource function" for each particular stream (or, less formally, for the processing element that produces the particular stream). Resource functions can be implemented to automatically estimate the stream rates of various streams under consideration and thereby estimate the network traffic. While each exemplary resource function described in the referenced patent application is relatively simple, the iterative composition of these resource functions can allow for the scheduler to appropriately "traverse" a directed workflow graph that expresses an application in teems of many different processing elements that consume and produce streams through input and output ports respectively. By utilizing the network traffic estimates provided by the resource functions, the scheduler is able to make a determination of how to optimally "overlay" the directed workflow graphs for the processing elements onto the traffic network graph to thereby control or minimize the total amount of network traffic and prevent consuming processing elements from flooding, which can result in network congestion, latency, packet loss, and poor performance. The scheduler will thereby decide which processing elements will share nodes to provide for effective bandwidth management.

A simple approach for providing for such predictions might be to implement, for each processing element or executable, a single resource function that is directly associated with the processing element. Such an approach, however, has a number of problems. First, it requires that data be gathered on each processing element, and such data may not always be available. Additionally, different processing elements will be of different types such as, for example, a classifier, a filter, a join, etc., and may have different arguments that significantly affect its performance. Furthermore, an intelligent resource function learner for a processing element should take into account the flow specification with which the processing element is run. A flow specification describes an externally observable flow of data streaming through a processing element's ports or parameters. Such logical flows may be realized through ports and connections of different data types and a combination of data, event, and event data ports. Flow specifications represent flow sources (streams originating within a processing element), flow sinks (streams ending within a component), and flow paths (stream paths through a component from its incoming ports to its outgoing ports). Flow specifications can provide expected and actual values for flow-related properties (for example, latency).

SUMMARY OF THE INVENTION

The shortcomings of the prior art can be overcome and additional advantages can be provided through exemplary embodiments of the present invention that are related to a method for generating a resource function estimate of resource usage by an instance of a processing element configured to consume zero or more input data streams in a stream processing system having a set of available resources. The method comprises receiving at least one specified performance metric for the zero or more input data streams and a processing power of the set of available resources, wherein one of the at least one specified performance metric is stream rate; generating a multi-part signature of executable-specific information for the processing element and a multi-part signature of context-specific information for the instance of the processing element; accessing a database of resource functions to identify a static resource function corresponding to the multi-part signature of executable-specific information and a context-dependent resource function corresponding to the multi-part signature of context-specific information; combining the static resource function and the context-dependent resource function to form a composite resource function for the instance of the processing element; and applying the resource function to the at least one specified performance metric and the processing power to generate the resource function estimate of the at least one specified performance metric for processing by the instance of the processing element.

The shortcomings of the prior art can also be overcome and additional advantages can also be provided through exemplary embodiments of the present invention that are related to computer program products and data processing systems corresponding to the above-summarized method are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution that can be implemented in combination with a scheduler in a distributed stream processing to provide for more accurate and flexible scheduling by providing accurate estimates of the effects of varying resource allocations for an application to the scheduler. Exemplary embodiments can be implemented to decouple the main input for a scheduler into well-defined atomic components by employing a resource function for each particular stream.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description of exemplary embodiments of the present invention taken in conjunction with the accompanying drawings in which:

FIG. 1 is a flow diagram illustrating an exemplary embodiment of a general process for iteratively generating an importance function.

FIG. 2 is a block diagram illustrating a simplified view of a set of exemplary processing elements and incoming and outgoing streams.

Figure 3:
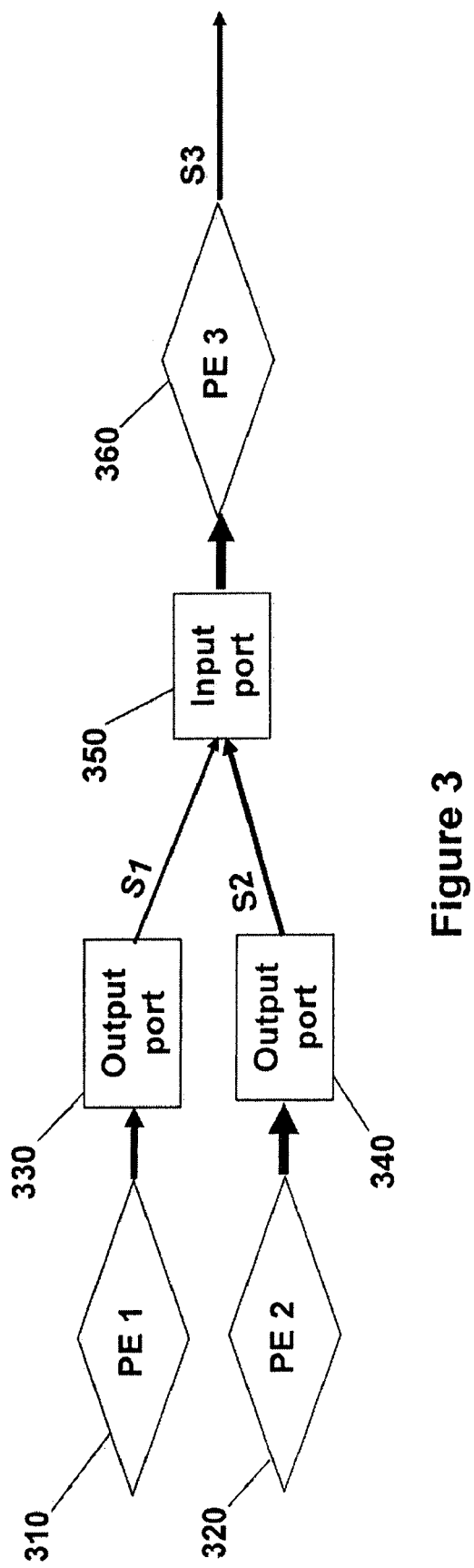
FIG. 3 is a block diagram illustrating a view of an exemplary stream and processing element pairs, together with input ports and output ports.

The detailed description explains exemplary embodiments of the present invention, together with advantages and features, by way of example with reference to the drawings. The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

DETAILED DESCRIPTION OF EXEMPLARY EMBODIMENTS

While the specification concludes with claims defining the features of the invention that are regarded as novel, it is believed that the invention will be better understood from a consideration of the description of exemplary embodiments in conjunction with the drawings. It is of course to be understood that the embodiments described herein are merely exemplary of the invention, which can be embodied in various forms. Therefore, specific structural and functional details disclosed in relation to the exemplary embodiments described herein are not to be interpreted as limiting, but merely as a representative basis for teaching one skilled in the art to variously employ the present invention in virtually any appropriate form. Further, the terms and phrases used herein are not intended to be limiting but rather to provide an understandable description of the invention.

Exemplary embodiments of the present invention disclosed herein are directed to a mechanism for predicting resource usage for reusable stream processing elements in a distributed stream processing systems In exemplary embodiments, the mechanism can be implemented for predicting resource usage for processing elements that are configured to consume zero or more input data streams and produce an output data stream, as well as for the special case of sink processing elements that are configured to consume one or more input streams but not produce an output data stream. In exemplary embodiments, the mechanism can be configured to provide resource functions and filter factors for input and output streams, and these resource functions and filter factors can be employed by a scheduler for a stream-based distributed computer system as key estimates or predictions of the effects of various resource allocations for the Individual processing elements in the system. In exemplary embodiments, the resource functions can be employed in quantity-based mode all of the time, and, optionally, in quality-based mode, as specified by the requirements imposed by users of the system. By providing for these key estimates or predications, exemplary embodiments can be implemented in combination with a scheduler to provide for more accurate and flexible scheduling.

In particular, a resource function for a particular stream accepts one or more performance metrics for streams feeding into a processing element that produces a particular stream along with the processing speed (which can be expressed in MIPS) of the resources that will theoretically be used by the producing processing element as input, and produces the resulting performance metric of the stream itself as output. For each processing element executable, the time taken to process a given data item can be learned, offline, as part of a calibration process. The processing elements within a stream processing system may individually rely on separate metrics, such as stream rate, input stream consumption, input stream age, completion time, etc. for assessing the values of the streams, and an increase in processing power may affect these values differently. For the special case of sink processing elements that are configured to consume one or more input streams but not produce an output data stream, the resource function takes as input the performance metrics on the more or more input streams and output the computational resources (expressed in MIPS) needed to handle the quantity and/or quality of the input.

In exemplary embodiments, the performance metrics may be quality-oriented, such as reliability-based metrics, or they may be quantity-oriented, such as goodput, which is the amount of data per unit of time produced by a processing element. For example, a classifier for classifying inputs into defined output categories may be able to output classifications with certain quality-dependent false-positive and false-negative rates for a given amount of available resources, but output classification can be provided more accurately as the amount of resources available to the classifier increases. In exemplary embodiments, resource functions can be implemented to also handle these quality-dependent performance metrics. A scheduler will always require quantity-based resource functions such as those based on stream rate, and may also optionally employ quality-based resource functions as determined by user input. The particular choice of quality-dependent metrics is not a limiting aspect of exemplary embodiments of the present invention.

Each derived stream produced by a job will have an importance that constitutes the weighted value associated with the stream. This weighted value determines the amount of resources to be allocated to processing element executable that will be run and may be the sum and product of multiple weight terms. This may include an arbitrary real-valued function whose domain is a cross product from a specified list of performance metrics such as rate, quality, input stream consumption, input stream age, completion time, etc. In exemplary embodiments, each resource function maps the cross products of the value function domains of each derived stream consumed by a processing element with the resource given to that processing element into the value function domain of the produced stream. A value function of zero is acceptable, and it can be expected that a majority of intermediate streams will have value functions of zero in exemplary embodiments in which most of the value of the system will generally be placed on the final streams. Nevertheless, exemplary embodiments can be designed to be completely general with regard to value functions.

That is, the processing resources assigned to upstream processing elements can be mapped to the domain of this value function through an iterative composition of resource functions in which one resource function is provided for each derived stream produced by such a processing element. One sum may arise from the job that produces the stream and others may arise from the jobs that consume the stream is the jobs are performed. The summation of the importance over all derived streams constitutes the overall importance being produced by the stream processing system. The derived streams for which resource functions need to be applied can be maintained in a ready list of streams that have been loaded into main memory and are ready for processing. The ready list can be computed, for example, through topological sorting in which the streams are represented as stream nodes.

Exemplary embodiments can be implemented to operate by dividing the information for predicting resource-usage for a processing element into two categories. The first category is the executable-specific information for the processing element, and the second category is the context-specific information, such as the content of registers, physical memory addressing, etc. during an actual instance of the process performed by the processing element. The context of a process is typically stored in the registers of the computer system upon which the process is executing during execution of an instances and in memory otherwise. Both categories of information can be stored and updated dynamically, and the information can be recombined as needed for passing to the scheduling component. By combining the static executable-specific information and the dynamic, context-specific information for an instance, exemplary embodiments can be implemented to provide for accurate estimates of the effects of varying resource allocations that can then be utilized by the scheduler to create an optimized schedule.

In a distributed stream processing system, the processing elements are connected in different ways depending the application, and, in many instances, some of the output data from one processing element may be irrelevant to the next processing element and therefore ignored. That is, there is not always a one-to-one mapping between input data streams and output data streams. This can affect the incoming data rates to a processing element, sometimes substantially. Therefore, in addition to being configured to keep track of the resource function described above, exemplary embodiment of the present invention can be implemented to record the filter factors, or selectivity, which corresponds to the percentage of packets created by a source processing element that actually reach the target processing element, from one processing element to the next. These filter factors, which corresponds to application-specific drop rates, can then be provided as input to a scheduler. The filter factor value for a producing processing element depends primarily on the context-dependent information of the processing element, and typically will vary a great deal between jobs. For this reason, exemplary embodiments can be implemented to store the filter factor using signature-to-signature pairs. The average selectivity of each input port of a processing element is used in cases in which the signature-to-signature pair does not exist.

Exemplary embodiments of the present invention can be implemented to provide a mechanism for learning the resource functions themselves, as well as a mechanism for storing, maintaining, and selecting the most appropriate resource functions for the processing elements at run time. In exemplary embodiments, the mechanism for learning the resource functions can be implemented using either a method for a single tree resource function learner or a method for a double tree resource learner. The single tree learner approach is less complex, while double tree learner approach can provide better accuracy. The double tree learner approach can be implemented in exemplary embodiments in which the overhead is not considered too costly. In exemplary embodiments, the mechanism for storing, maintaining, and selecting the most appropriate resource functions can be configured to determine the static resource function associated with a particular stream or processing element, determine the complete resource function, static or dynamic, for a particular stream or processing element, populate the resource function database, and perform dynamic updating of the resource functions during the execution of the processing elements.

To provide accurate estimations of resource functions, exemplary embodiments of the present invention adopt a hierarchical approach, based on the provision of a multi-part signature for each processing element that can be used to identify a resource functions match for the processing element from a database of resource functions. The parts of the signature can range from very generic to very specific, and a best match for an instance or executable of a processing element is determined at runtime. Therefore, exemplary embodiments can be implemented to make the best use of the available data to provide for accurate predictions of resource functions. In some exemplary embodiments, the resource functions for processing elements can be stored and employed statically. In other exemplary embodiments, because the importance of tasks can change frequently and dramatically for a particular application in a distributed stream processing system (for example, as a result of discoveries, new and departing queries, unpredictable changes in primal streams, etc.), the resource functions can be updated dynamically during the execution of the processing elements themselves to achieve improved scheduling results.

Exemplary embodiments of the present invention could be implemented as an aspect of a scheduler for a distributed stream processing system or, alternatively, as a component within the system that is separate from and configured to provide resource functions (as well as filter factors in some embodiments) to the scheduler. A test could be performed on exemplary embodiments by running a processing element executable in a variety of different contexts and determining if the resource allocations to the processing element properly adjust as specified.

Referring now to FIG. 1, a flow diagram depicting an exemplary embodiment of a general process 100 for iteratively generating an importance function, which provides a sequential hierarchy of nominal precedence of streams, for a particular directed workflow graph of nodes corresponding to processing elements and streams in an application running within stream processing system. The directed workflow graph specifies the streaming connections among processing elements in an application, matching stream descriptions of output ports with the flow specifications of inputs ports. The nodes in the graph represent to the tasks in a particular application, which correspond to the processing elements, and the directed arcs interconnecting the nodes represent the streams, which may be either primal or derived.

In exemplary process 100, streams S1, S2, and S4 are initially available in the ready list, so the corresponding resource functions are applied with no input streams. Subsequently, stream S3 becomes available in the ready list, which results in application of the resource function with input streams S1 and S2. Next, stream S5 becomes available in the ready list, so the resource function is applied with input streams S3 and S4. Following this, a weighted value function is applied to stream S5, and the result is the contribution of this graph to the overall importance function. The resource function predicts a measure of output stream rate, as well as quality in some exemplary embodiments, as a function of comparable measure for the input streams and the MIPS (given to the producing processing element. The iterative composition of the resource functions and the weighted value functions for the directed work flow graph of FIG. 1 can be provided as follows: (MIPS1, MIPS2, MIPS3, MIPS4, MIPS5)→(S[S1], S[S2], MIPS3, MIPS4, MIPS5)→(S[S3], S[S4], MIPS5)→(S[S5])→R, which represents the resource function.

To further describe and clarify the notion of a resource function, FIG. 2 provides a block diagram illustrating a simplified view of a set of exemplary processing elements and incoming and Outgoing streams. Blocks 210-230 depict the processing elements, and paths S1-S3 depict the streams. Streams S1 and S2 are provided as input streams to processing element 230, while stream S3 is provided as an output stream. To further describe and clarify the notion of a filter factor, FIG. 3 provides a block diagram illustrating a more realistic view of a stream and its processing element pairs, together with input polls and output ports. Ports provide filters on streams, and therefore, consuming processing elements will generally not see all of the data producing processing elements produce. The output stream rate for processing element can be predicted from its input stream rate and processing power, or MIPS. Output ports 330, 340 correspond to processing elements 310, 320 respectively. Input port 350 corresponds to processing element 360. The widths of the directed arcs in the figure indicate the relative rates. The width of the directed are between input port 350 and processing element 360 is the sum of the widths of the two directed arcs between output ports 330, 340 and input port 350. Thus, the filter factors are indicated in graphical terms, the second being larger than the first.

To provide accurate estimations of resource functions, exemplary embodiments of the present invention adopt a hierarchical approach, based on the provision of a multi-part signature for each processing element that can be used to identify a resource function match for the processing element from a database of resource functions. That is, to determine the static resource function associated with a particular processing element, a multi-part signature for the executable-specific aspect of the processing element is first computed. The parts of the signature can range from very generic to very specific, and a best match for an instance or executable of a processing element is determined at runtime. A first part of the signature is computed using the processing element's type, a second part is computed using the executable for processing element (that is, the specification of the processing element's function, as well as its input and output ports), a third part is computed using the executable along with its arguments (that is, specification of the streams the processing element is configured to produce on its output ports and the streams the processing element is interested in consuming on its input ports), and a fourth part is computed using is the executable, its arguments, and the flow specification for the processing element.

Once the signature is computed, an attempt is made to match the full signature (that is, including of its parts) against a database of resource functions. If no match is found for a specific instance, the resource function that is initially used will match the type of the processing element. If a match is found for the specific executable for the processing Clement but not with the correct set of arguments, the resource function can be determined based upon the executable data. If matching data is found for the processing element with the correct set of arguments, the resource function can be determined based upon that data. If information is available on the flow specification for the processing, element, which declares the characteristics of the streams the processing element is interested in consuming, the resource function can be determined based upon that data. Therefore, exemplary embodiments can be implemented to make the best use of the available data to provide for accurate predictions of resource functions.

If a match is found in the database, the result is returned as the static resource function for the processing element. If a match is not found, a series of iterative attempts are made to match progressively smaller portions of the signature until a match is found. More particularly, during each sequential iteration, one part of the multi-part signature will removed and an attempt to match the remaining parts of the signature against the database will be made. The iterative attempts are repeated until match is found, and a default resource function match is provided in the database for the case of an empty signature when no match is found after each part of the signature has been removed.

Figure 4:
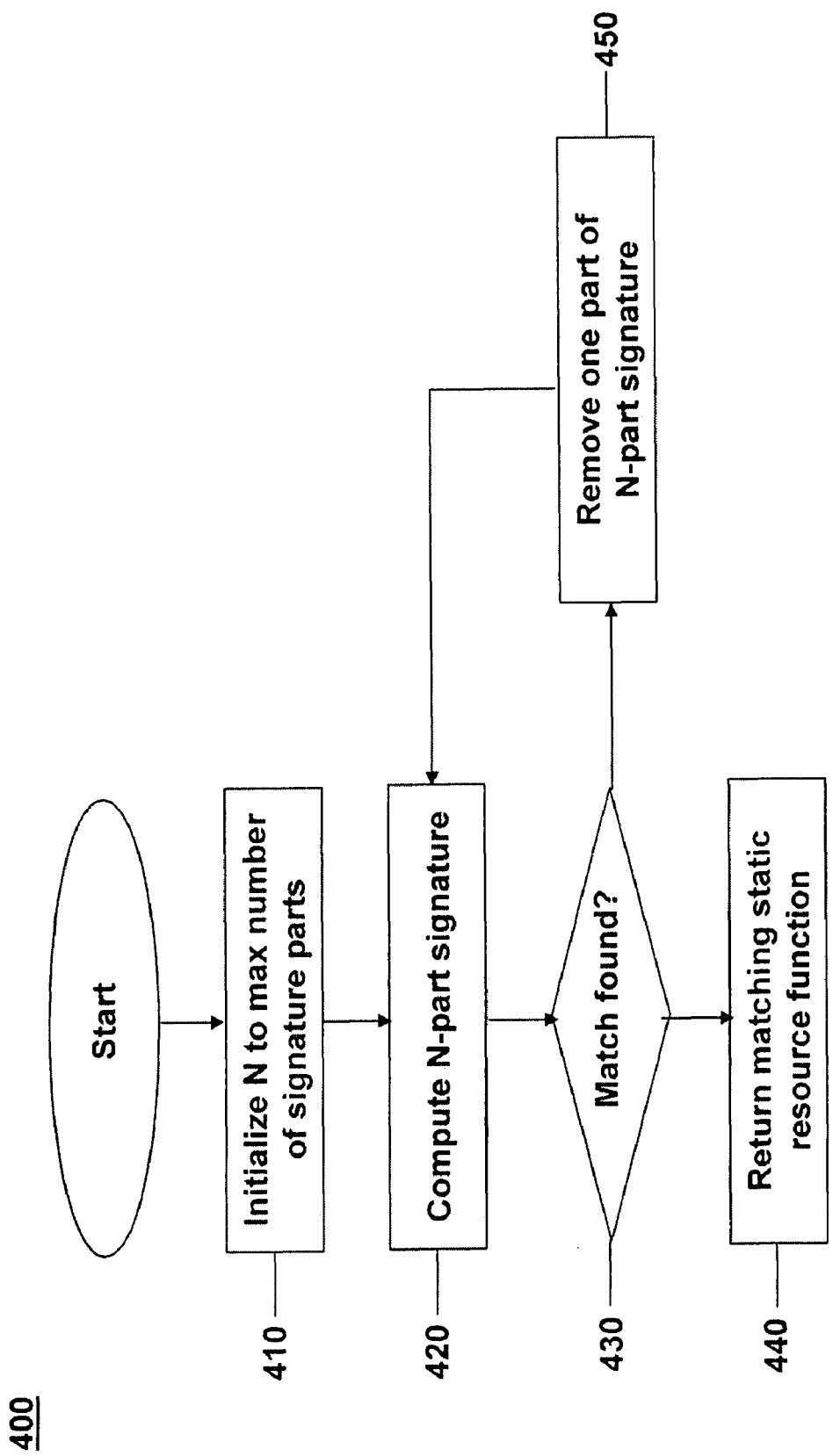
FIG. 4 is a flow diagram illustrating an exemplary embodiment of a process for determining a static resource function for a particular processing element.

FIG. 4 is a flow diagram illustrating an exemplary embodiment of a process for determining the static resource function associated with a particular processing element. At block 410, the value N is initialized to the maximum number of signature parts for the processing element. At block 420, the N-part signature is computed as described above. At block 430, the resource function database is accessed to attempt to locate a resource function match for the current parts of the signature. If a match is found at block 430, the process terminates at block 440, and the matching resource function is returned as the static resource function. If a match is not found at block 430, the process proceeds to block 450, at which N is decremented by one (that is, one part of the multi-part signature is removed). At this point, if N is equal to zero (that is, where all parts of the multi-part signature have been removed), a default resource function match is provided at block 460. Otherwise, the process returns to block 430 at which an attempt to locate a resource function match in the database for the parts of the signature that have not yet been removed is made.

In exemplary embodiments, to determine the complete resource function for a particular instance of a processing element, two actions are performed. First, the information for the executable-specific aspect of the signature is computed as described above for use in determining the static resource function associated with the processing element. Second, the context-specific aspect of the signature for the current instance of the executable is computed in a similar manner. The two pieces of information for the signature are then combined, and the result is returned the as the complete, final resource function for the particular instance of the processing element.

Figure 5:
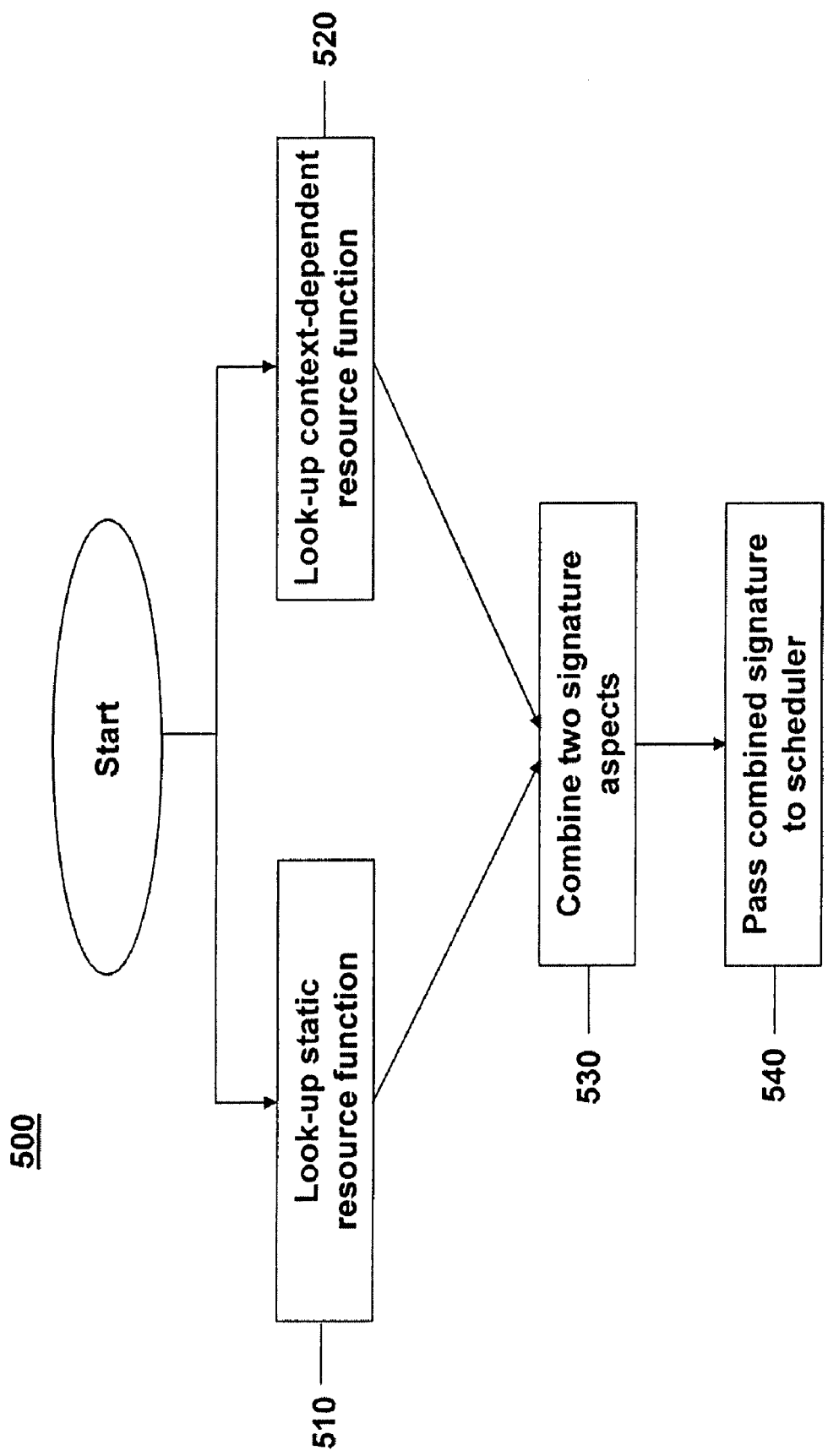
FIG. 5 is a flow diagram illustrating an exemplary embodiment of a process for determining a complete resource function for a particular processing element.

FIG. 5 is a flow diagram illustrating an exemplary embodiment of a process 500 for determining the complete resource function for a particular processing element. At block 510, a lookup of the static, executable-specific resource function signature aspect is performed, and at block 520, a lookup of the context-dependent resource function signature aspect is also performed. At block 530, the pieces of information in the two aspects of the signature are combined. At block 540, the combined signatures are passed to the scheduler.

In exemplary embodiments, to populate the resource function database, a number of different jobs and processing elements are run in a variety of training configurations, and the data points for these runs are collected to generate a training set. Data that is relevant to the context-dependent piece of the signature information is sent to a context-dependent updater module, while data relevant to the static piece of the signature information is sent to a static, executable-specific updater module. For each data point captured in each run, all possible signatures are associated with that data point, with the result that each raw data point can constitute a data point for many signature values. Once a library of data points is gathered that is deemed sufficient for a particular exemplary embodiment, the data can be divided by signature, and fits can be computed for these points.

Figure 6:
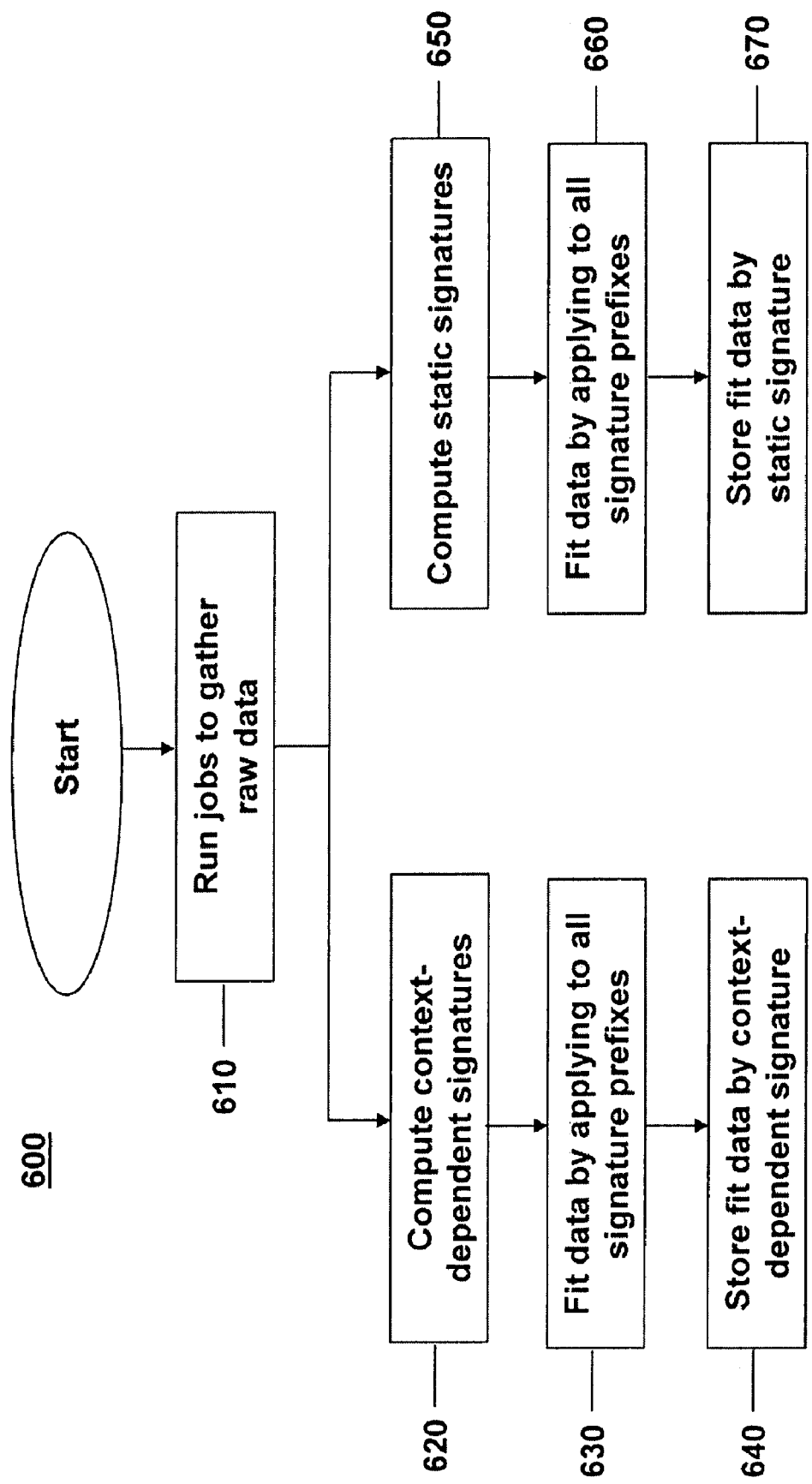
FIG. 6 is a flow diagram illustrating an exemplary embodiment of a process for populating a resource function database.

FIG. 6 is a flow diagram illustrating an exemplary embodiment of a process 600 for populating the resource function database. At block 610, the jobs are run in variety of configurations as described above, and the raw data is gathered. At block 620 the context-dependent signatures are computed. At block 630, the data is fitted to signatures by applying them to all signature prefixes. At block 640, the fitted data is stored in the resource function database according to the context-dependent signature to which it has been fitted. Operation corresponding to blocks 620-640 are performed in blocks 650-670 to store fitted data in the resource function database according to the static, executable-specific signature. More specifically, at block 650, the static signatures are computed. At block 660, the data is fitted to the static signatures by applying them to all signature prefixes. Finally, at block 670, the fitted data is stored in the resource function database according to the static executable-specific signature to which it has been fitted.

In exemplary embodiments, to perform a dynamic update of the resource function database, the resource function for all processing elements is computed as described above, and the jobs are started. Data is collected in the ruining, system, and individual data points provided with the corresponding signature as a key. The data is then fed back to the updater modules that are configured to adjust or update the resource functions in accordance with the new data. This results in new resource functions which are used in subsequent epochs, which correspond to a specified unit of time.

Figure 7:
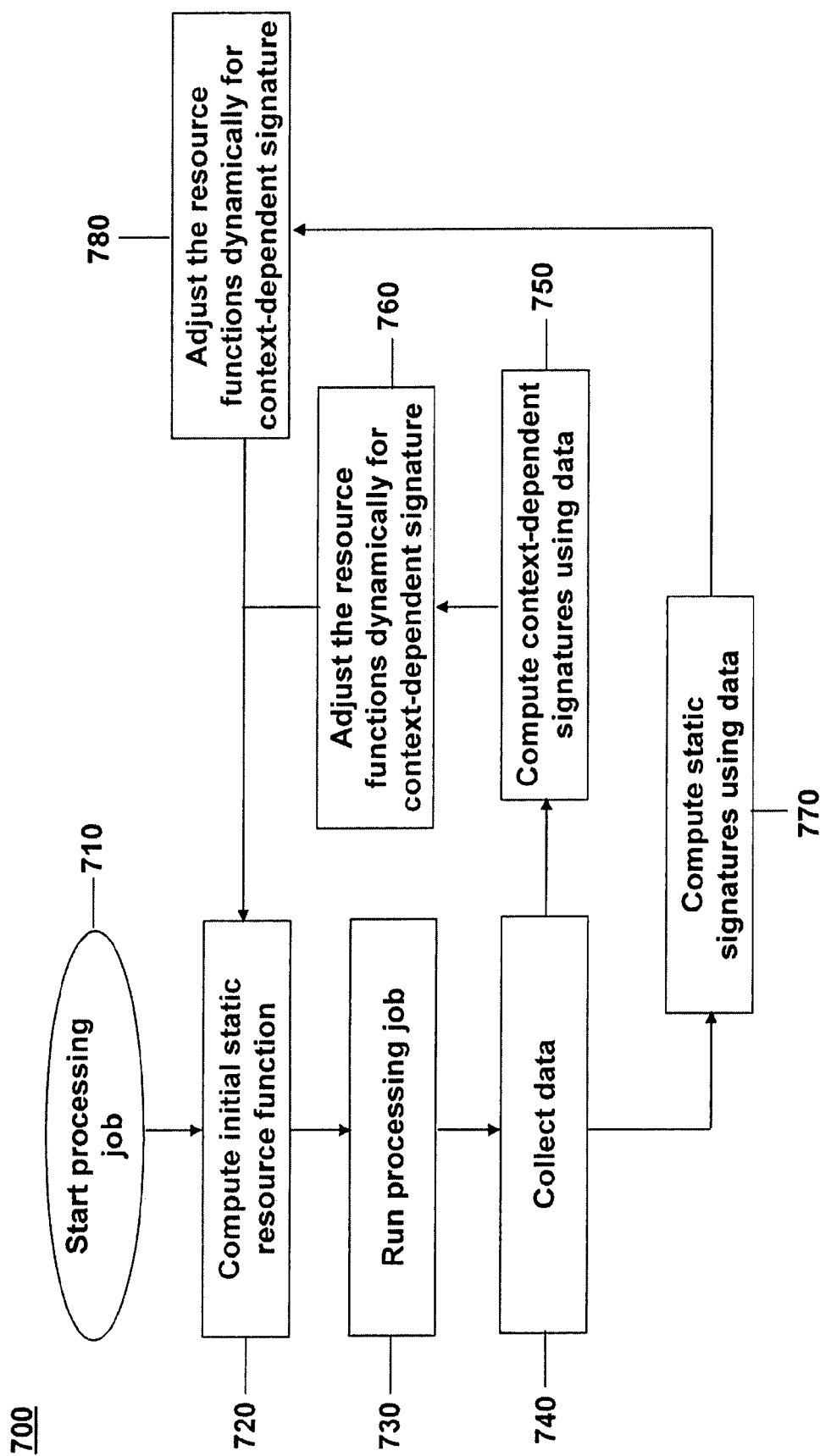
FIG. 7 is a flow diagram illustrating an exemplary embodiment of a process for performing a dynamic update of a resource function database.

FIG. 7 is a flow diagram illustrating an exemplary embodiment of a process 700 for performing a dynamic update of the resource function database. At block 710, processing of jobs is initiated. At block 720, the initial static resource functions are computed as described above, and the jobs begin to run at block 730. At block 740, data is collected as the jobs run. At block 750, the context-dependent signatures are computed as described above using the data collected in block 740. At block 760, to account for the newly collected data, the updater module adjusts the resource functions dynamically for the context-dependent signatures relevant to each resource function. Then, at block 720, the initial static resource functions are computed again. Operations corresponding to blocks 750-760 are performed in blocks 770-780 to store the newly-collected data in the resource function database for the static, executable-specific signatures relevant to each resource function. At block 770, the static signatures are computed as described above using the data collected in block 740. At block 780, the updater module adjusts the resource function dynamically for relevant static signatures, to account for the newly collected data, and then the process returns to block 720, and the initial static resource functions are computed again.

Figure 8:
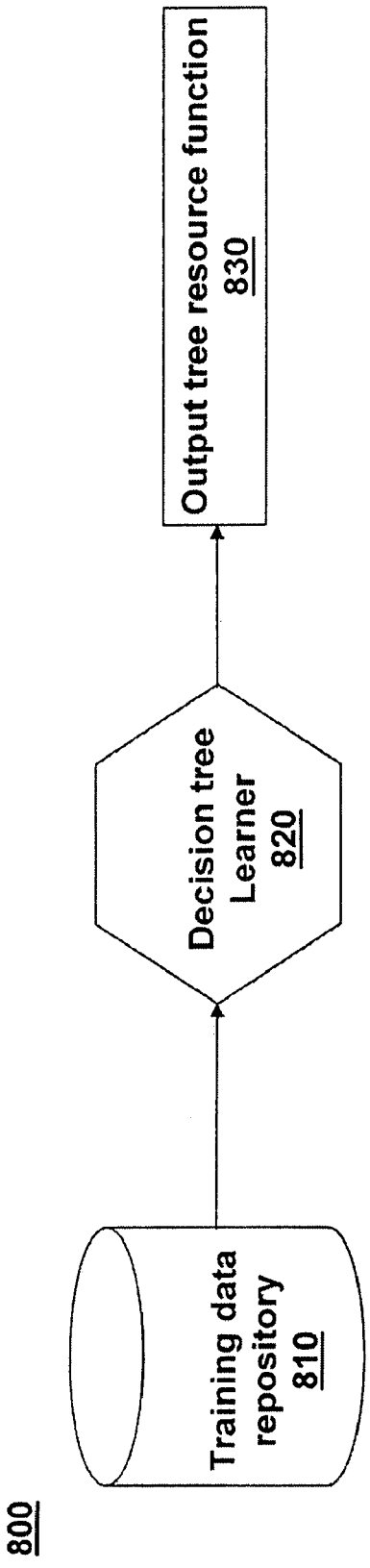
FIG. 8 is a block diagram illustrating the architecture of an exemplary embodiment of a resource function learner.

FIG. 8 is a block diagram illustrating the architecture of an exemplary embodiment of a resource function learner module 800 based on a decision tree model for learning the resource functions. A decision tree learner 820 is in communication with a repository 810 for storing and maintaining training data. Decision tree learner 820 processes the training data in repository 810 to compute an output tree resource function 830. The construction of "decision tree"-based resource functions in exemplary embodiments can provide for an unbiased, functional form for the resource function that is able to freely approximate arbitrary shapes of target functions without requiring that predetermined assumptions be made about those shapes. Because resource functions aim to describe processing elements that can serve various processing needs and exhibit many types of behaviors, it can be difficult or impossible to find a parametric functional form or mathematical equation for the resource function that is general enough. Thus, in exemplary embodiments in which resource functions are based upon decision trees, the resource functions can be provided with a sufficient level of generality.

Figure 9:
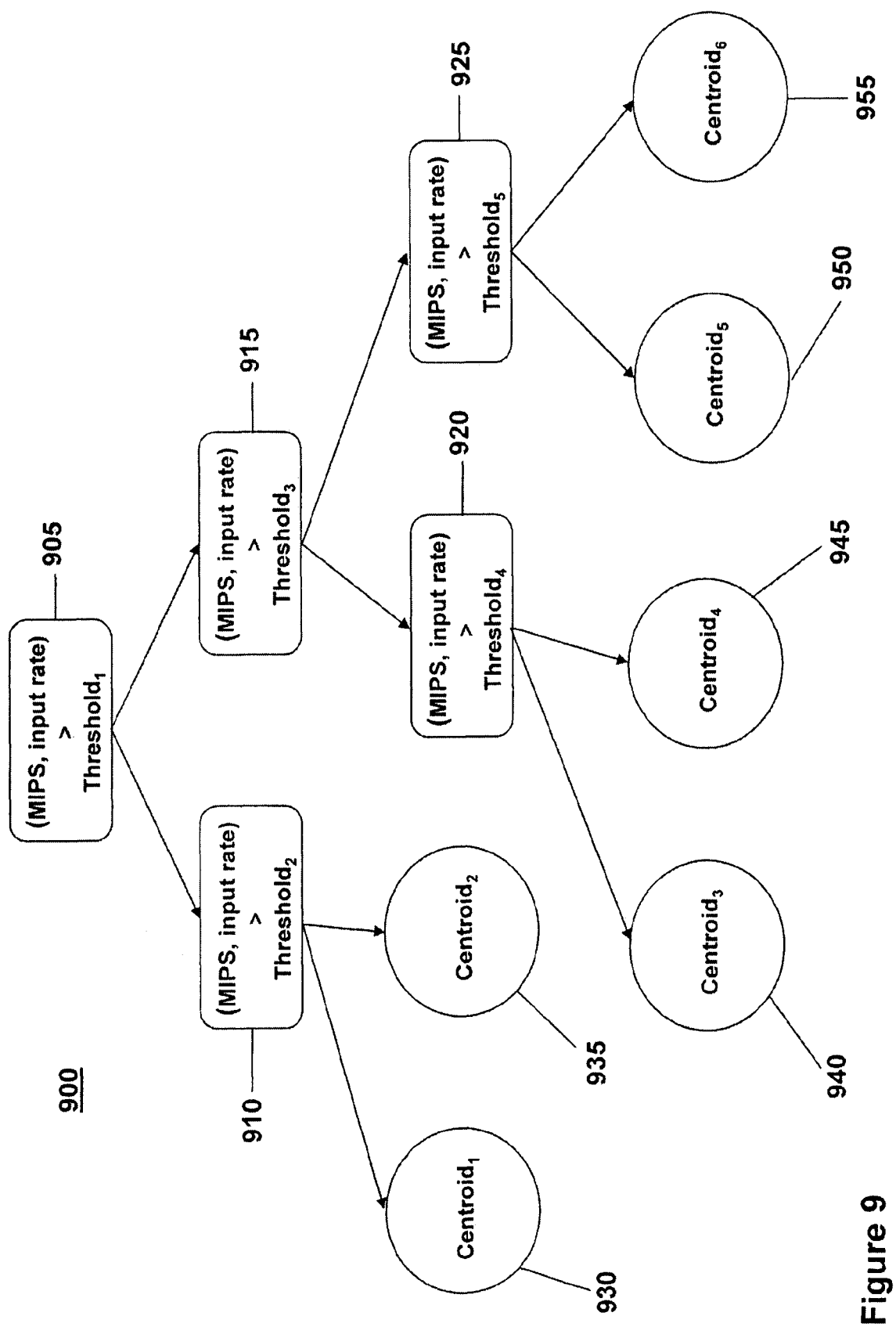
FIG. 9 is a flow diagram illustrating an exemplary embodiment of a process for performing resource function learning based on decision tree models.

FIG. 9 is a flow diagram depicting an exemplary embodiment of a process 900 for performing resource function learning based on decision tree models. Decision tree learning uses a decision tree as a predictive model that maps observations about an item to conclusions about the item's target value. Each interior node corresponds to a variable, and an arc to a child represents a possible value of that variable. A leaf represents a possible value of target variable given the values of the variables represented by the path from the root. As illustrated, the generic form of decision tree is composed of a number of interior nodes that test the value of independent variables against some chosen decision threshold, as well as a number of leaf nodes where decisions or predictions are made. In FIG. 9, nodes 905-925 are non-leaf splitting nodes, and nodes 930-955 are leaf nodes.

In the present exemplary embodiment, a resource function learner module is provided for the quantity-oriented performance metrics. In exemplary embodiments, quality-oriented performance metrics can be handled in a similar fashion to quantity-oriented metrics. In the resource function learner of the present exemplary embodiment, independent variables are based on the MIPS allocated to the target processing element, as well as to the various input stream rates describing the amount of data received by the target processing element. The dependent variable is the output stream rate describing the amount of data produced by the target processing element.

To construct decision trees, exemplary embodiments of the present invention can operate to group examples of similar independent variable values together. Grouping is performed at each non-leaf splitting node by testing the values of the independent variables against a chosen threshold. As a result, examples satisfying the same condition will be sorted into the same branch of the decision tree. At each leaf node, a centroid prediction is computed that constitutes is the average or expected value of the dependent variable (for example, the output stream rate in the exemplary embodiment of FIG. 9) for all that examples that have been sorted by the decision tree into the same leaf node. Because a scheduler can generally be expected to inherently require that a resource function be monotone (that is, non-decreasing as a function of each variable), a computation employing a linear regression equation is performed that utilizes the centroid values maintained at each leaf node to maintain this monotonic property in learning resource functions.

Typically, machine learning algorithms aim to optimize certain criteria, such as, for example, to minimize the mean square error (MSE) between the true output rate and the predicted output rate. In exemplary embodiments of the present invention, however, because the predicted output rate is computed to be provided to a scheduling application that is implemented, at least in part, to perform a resource allocation function, minimization of the error rate is not an effective optimization for the present purposes. In particular, a stream processing system is generally going to be limited by certain "physical constraints." and these constraints can and usually will vary between applications of the system. For example, one common constraint of stream processing systems is that for any given MIPS, or processing power, a processing element can only process streaming input data up to some maximum saturation rate. After that maximum saturation rate is reached, the output stream rate will automatically flatten and not continue to increase as a function of the input stream rate. As another example, processing elements that are configured to simply process every byte of an input data stream and then "forward" the processed data to the next processing element will never provide an output stream rate that is greater than its input stream rate.

Constraints of this type can prove to be difficult to incorporate into the "optimization criteria" for typical machine learning algorithms. Because machine learning algorithms are designed as generic formulas for minimizing error, physical constraints are typically not easily formulated as "error" that can be incorporated into the criteria of such a formula. To solve these problems, exemplary embodiments of the present invention can be implemented to construct a "multiple" intermediate resource function model for managing physical constraints. In such a design, each of the multiple intermediate resource functions can be implemented to optimize a single specified criterion, and the physical relationship among the multiple models can imposed after resource function learning is performed.

Figure 10:
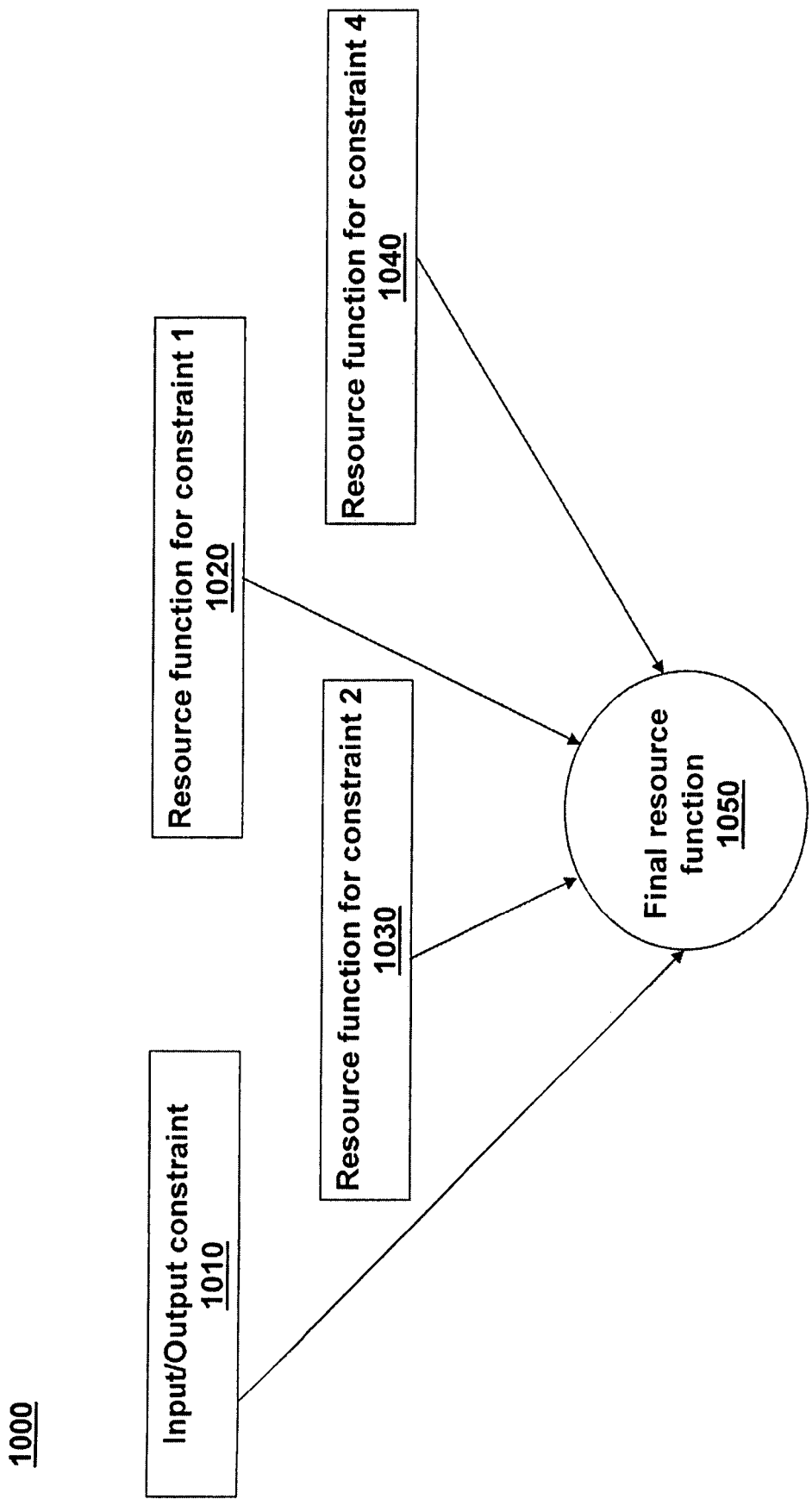
FIG. 10 is a flow diagram illustrating an exemplary embodiment of a process for managing physical constraints using a multiple resource function model.

In example embodiments, for most applications of stream processing systems, each processing element would require two individual resource functions. The first resource function would describe the relationship between MIPS, input stream rate, and output stream rate prior to the maximum saturation condition for a processing element, and the second resource function would measure the relationship between MIPS (regardless of input stream rate) and output stream rate after saturation has actually occurred. The composite model will be provided as the minimum of these two functions. In exemplary embodiments, additional physical constraints between input stream rate and output stream rate can be implemented as additional resource functions. For example, a resource function could be implemented that requires that output stream rate never be more than the input stream rate. FIG. 10 is a flow diagram depicting an exemplary embodiment of a process 1000 for managing physical constraints using a multiple resource function model. As illustrated, the various intermediate resource functions that are each implemented to optimize a single specified constraint are depicted in blocks 1010-1040 and are combined into a final resource function in block 1050.

Exemplary embodiments of the present invention can take the form of an entirely hardware embodiment, an entirely software embodiment, or an embodiment including both hardware and software elements. In exemplary embodiments implemented in software, the software can include, but is not limited to, firmware, resident software, microcode, etc.

Furthermore, exemplary embodiments can take the form of a computer program product accessible from a computer-usable or computer readable medium providing program code for use by or in connection with a computer or any instruction execution system. In exemplary embodiments, a computer-usable or computer-readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random access memory (RAM), a read-only memory (ROM), a rigid magnetic disk and all optical disk. Examples of optical disks include read only memory compact disk (CD-ROM), read/write compact disk (CD-R/W) and DVD.

In exemplary embodiments, a data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

In exemplary embodiments, network adapters may also be coupled to the system to enable the data processing system to become coupled to other data processing systems or remote printers or storage devices through intervening private or public networks. Modems, cable modems, and Ethernet cards are just a few of the currently exemplary types of network adapters.

Although exemplary embodiments of the present invention have been described in detail, it should be understood that various changes, substitutions and alternations can be made therein without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the present invention.

While exemplary embodiments of the present invention have been described, it will be understood that those skilled in the art, both now and in the future, may make various modifications without departing from the spirit and the scope of the present invention as set forth in the following claims. These following claims should be construed to maintain the proper protection for the present invention.

What is claimed is:

1. A method for generating a resource function estimate of resource usage by an instance of a processing element configured to consume zero or more input data streams in a stream processing system having a set of available resources for the processing element to use, the method comprising:

receiving at least one specified performance metric for the zero or more input data streams and a processing power of the set of available resources, wherein one of the at least one specified performance metric is stream rate;

generating a multi-part signature of executable-specific information for the processing element and a multi-part signature of context-specific information for the instance of the processing element;

accessing a database of resource functions to identify a static resource function corresponding to the multi-part signature of executable-specific information and a context-dependent resource function corresponding to the multi-part signature of context-specific information;

combining the static resource function and the context-dependent resource function to form a composite resource function for the instance of the processing element; and applying the composite resource function to the at least one specified performance metric and the processing power to generate the resource function estimate of the at least one specified performance metric for processing by the instance of the processing element.

2. The method of claim 1, wherein the resource function estimate is generated for processing by the instance of the processing element to produce an output data stream.

3. The method of claim 1, wherein the resource function estimate is generated for processing by the instance of the processing element to consume one or more input data streams without producing an output data stream.

4. The method of claim 1, wherein the at least one specified performance metric comprises at least one quality-based performance metric.

5. The method of claim 1, wherein the at least one specified performance metric comprises at least one quantity-based performance metric in addition to stream rate.

6. The method of claim 2, wherein the multi-part signature of executable-specific information comprises a first part that is generated according to a type for the processing element, a second part that is generated according to an executable for the processing element, a third part that is generated according to the executable, the zero or more input data streams, and the output stream for the processing element, and a fourth part that is generating according to the executable, the zero or more input data streams, the output stream, and a flow specification for the processing element.

7. The method of claim 3, wherein the multi-part signature of executable-specific information comprises a first part that is generated according to a type for the processing element, a second part that is generated according to an executable for the processing element, a third part that is generated according to the executable and the one or more input data streams stream for the processing element, and a fourth part that is generating according to the executable, the one or more input data streams, and a flow specification for the processing element.

8. The method of claim 6, wherein accessing a database of resource functions to identify a static resource function comprises iteratively attempting to identify the static resource function in the database of resource functions corresponding to the multi-part signature of executable-specific information until the static resource function is identified, and wherein a part of the multi-part signature of executable-specific information is discarded in each successive iterative attempt.

9. The method of claim 8, wherein a default resource function is identified as the static resource function if each part of the multi-part signature of executable-specific information has been discarded in successive iterative attempts without identifying the static resource function.

10. The method of claim 6, wherein accessing a database of resource functions to identify a context-dependent resource function comprises iteratively attempting to identify the context-dependent resource function in the database of resource functions corresponding to the multi-part signature of context-specific information until the context-dependent resource function is identified, and wherein a part of the multi-part signature-e of context-specific information is discarded in each successive iterative attempt.

11. The method of claim 10, wherein a default resource function is identified as the context-dependent resource function if each part of the multi-part signature of context-specific information has been discarded in successive iterative attempts without identifying the context-dependent resource function.

12. The method of claim 1, further comprising providing the resource function estimate to a scheduler for the stream processing system.

13. The method of claim 12, further comprising computing a filter factor for the processing element and providing the filter factor to the scheduler.

14. The method of claim 1, further comprising populating the database of resource functions by performing a plurality of application runs on the stream processing system in a plurality of training configurations, collecting a training set of data from the plurality of application runs for the processing element, dividing the set of training data into executable-specific training data and context-specific training data, and generating a plurality of static resource functions corresponding to the executable specific training data and a plurality of context-dependent resource functions corresponding to the context-specific training data.

15. The method of claim 14, further comprising dynamically updating the database of resource functions during execution of the instance of the processing element by collecting a set of data during execution of the instance, dividing the set of data into executable-specific data and context-specific data, and updating the plurality of static resource functions according to the executable specific data and the plurality of context-dependent resource functions according to the context-specific data.

16. The method of claim 14, wherein generating a plurality of static resource functions and a plurality of context-dependent resource functions is performed by a decision tree learner module.

17. The method of claim 1, wherein the static resource function and the context dependent resource function are combined with at least one additional physical constraint-mapping resource function to form an additional composite resource function for the instance of the processing element.

18. A computer-usable medium having computer readable instructions stored thereon for execution by a processor to perform a method for generating a resource function estimate of resource usage by an instance of a processing element configured to consume zero or more input data streams in a stream processing system having a set of available resources for the processing element to use, the method comprising:
receiving at least one specified performance metric for the zero or more input data streams and a processing power of the set of available resources, wherein one of the at least one specified performance metric is stream rate;
generating a multi-part signature of executable-specific information for the processing element and a multi-part signature of context-specific information for the instance of the processing element;
accessing a database of resource functions to identify a static resource function corresponding to the multi-part signature of executable-specific information and a context-dependent resource function corresponding to the multi-part signature of context-specific information;
combining the static resource function and the context-dependent resource function to form a composite resource function for the instance of the processing element; and
applying the composite resource function to the at least one specified performance metric and the processing power to generate the resource function estimate of the at least one specified performance metric for processing by the instance of the processing element.

19. A data processing system comprising:
a central processing unit;

a random access memory for storing data and programs for execution by the central processing unit;

a first storage level comprising a nonvolatile storage device; and computer readable instructions stored in the random access memory for execution by central processing unit to perform a method for generating a resource function estimate of resource usage by an instance of a processing element configured to consume zero or more input data streams in a stream processing system having a set of available resources for the processing element to use, the method comprising:

receiving at least one specified performance metric for the zero or more input data streams and a processing power of the set of available resources, wherein one of the at least one specified performance metric is stream rate;

generating a multi-part signature of executable-specific information for the processing element and a multi-part signature of context-specific information for the instance of the processing element;

accessing a database of resource functions to identify a static resource function corresponding to the multi-part signature of executable-specific information and a context-dependent resource function corresponding to the multi-part signature of context-specific information;

combining the static resource function and the context-dependent resource function to form a composite resource function for the instance of the processing element; and applying the composite resource function to the at least one specified performance metric and the processing power to generate the resource function estimate of the at least one specified performance metric for processing by the instance of the processing element.

\* \* \* \* \*